Figure 1:
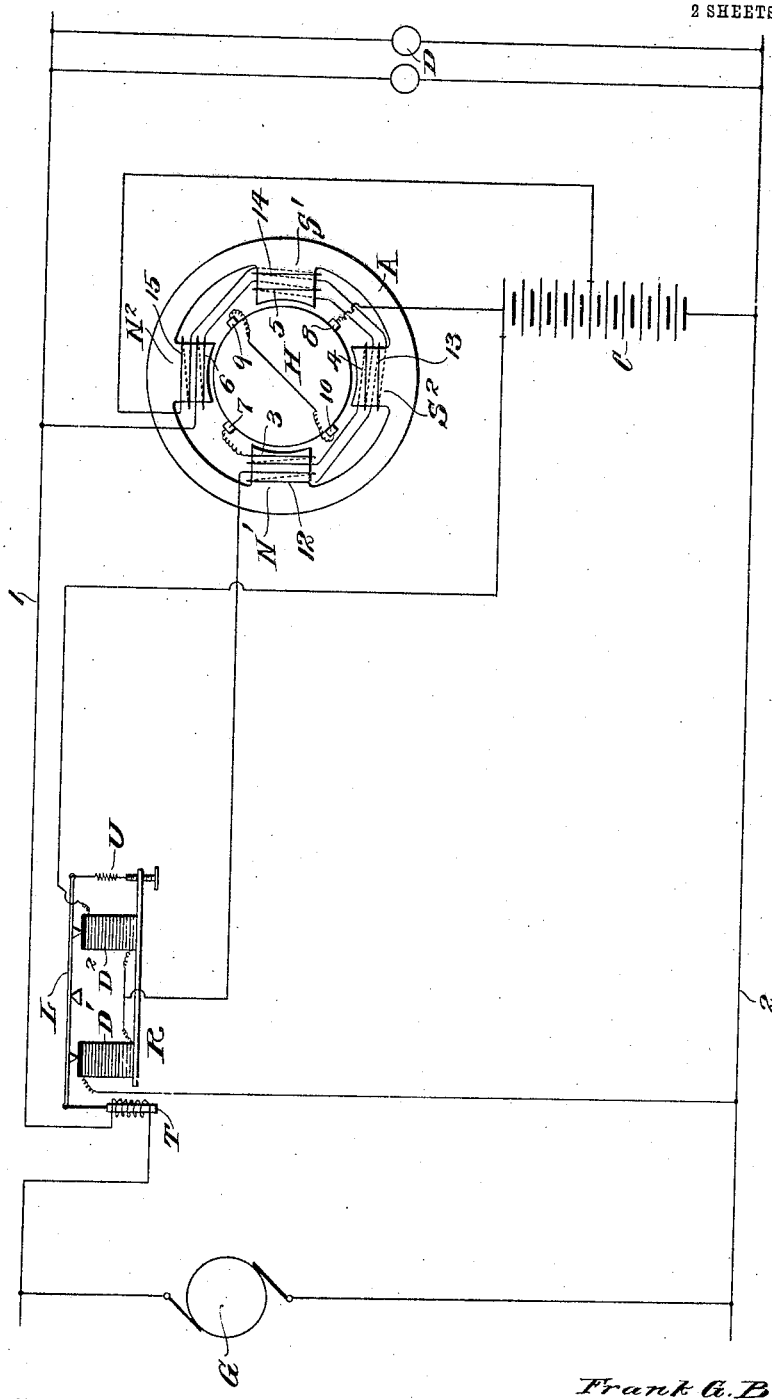

F. G. BEETEM.
SYSTEM OF ELECTRICAL DISTRIBUTION.
APPLICATION FILED FEB. 12, 1908.

937,018.

Patented Oct. 12, 1909.
2 SHEETS—SHEET 1.

Witnesses

Inventor
Frank G. Beetem
By
Augustus D. ......
Attorney

F. G. BEETEM.
SYSTEM OF ELECTRICAL DISTRIBUTION.
APPLICATION FILED FEB. 12, 1908.
937,018.
Patented Oct. 12, 1909.
2 SHEETS—SHEET 2.
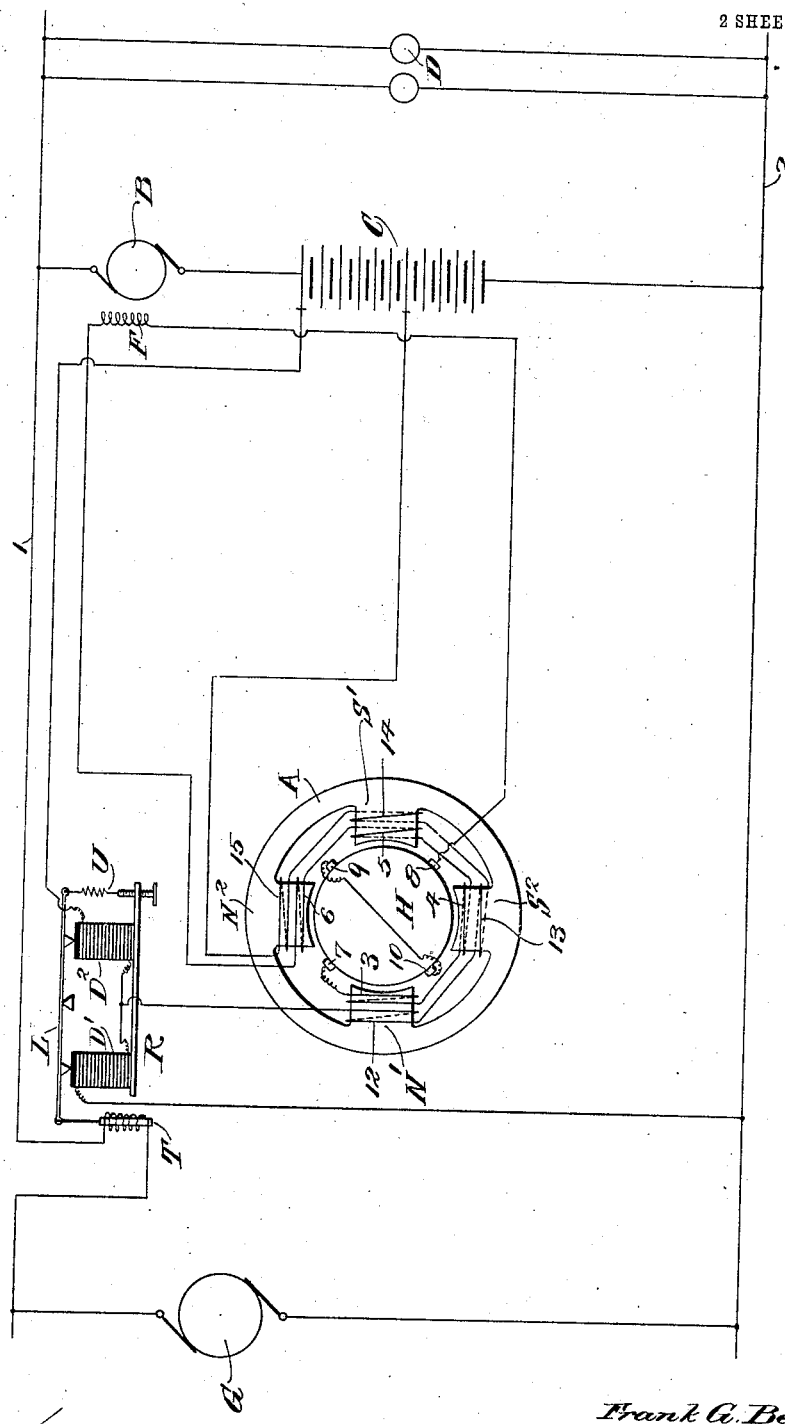
Inventor
Frank G. Beetem.
By
Augustus B. Stoughton
Attorney ic
UNITED STATES PATENT OFFICE.

FRANK G. BEETEM, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

SYSTEM OF ELECTRICAL DISTRIBUTION.

937,018.  Specification of Letters Patent.  Patented Oct. 12, 1909.

Application filed February 12, 1908. Serial No. 415,521.

*To all whom it may concern:*

Be it known that I, FRANK G. BEETEM, a citizen of the United States, residing at Philadelphia, in the county of Philadelphia and State of Pennsylvania, have invented a certain new and useful System of Electrical Distribution, of which the following is a specification.

My application relates to systems of electric distribution in which a storage battery is employed to compensate for fluctuations of load or voltage on an electric circuit.

The principal object of my invention is to provide more sensitive means for controlling the operation of the battery.

The nature and scope of my invention will be more fully understood by referring to the accompanying diagrams, in which—

Figure 1, shows a specially designed dynamo connected in series between the battery and the circuit and arranged to act as a battery booster, while in Fig. 2, a booster of the usual type is employed and the specially designed dynamo is employed as an exciter for controlling the field of the booster.

Referring to Fig. 1, G, is the main generator supplying current to the circuit 1, 2, to which are connected translating devices D, constituting a fluctuating load. Across the circuit 1, 2, is connected a storage battery C. In series between the battery and conductor 1, is connected a dynamo electric machine A, which may be suitably driven in any manner. This machine as here shown is provided with a bi-polar wound armature H, revolving in a field structure provided with four polar projections $N^1$, $N^2$, $S^1$ and $S^2$. Two pair of brushes are shown of which one pair 9 and 10, are short circuited, while the other pair 7 and 8, are connected between the battery and conductor 1. Two field windings are shown on the poles of this machine. One of these 3, 4, 5, 6, is a series winding connected in series between brush 7, and conductor 1. This winding is designed to exactly neutralize the armature reaction due to current flowing through the armature between brushes 7 and 8. The other field winding 12, 13, 14, 15, is connected between the carbon regulator R and the middle point of the battery. The carbon regulator R, consists of two piles of carbon disks $D^1$ and $D^2$, the pressure on which may be varied by the lever L, so as to increase the pressure on one pile and simultaneously decrease the pressure on the other. The operation of the lever L, is controlled by an adjustable spring U, at one end and a solenoid T, at the other, the latter being connected into the conductor 1, so as to carry the output of the generator G. The operation of this regulator will therefore respond to small variations of current in the conductor 1, so as to produce a flow of current in either direction through the field winding 12, 13, 14, 15 according to whether the output from the generator G, is slightly above or below some predetermined average. The field winding 12, 13, 14, 15, is so designed that a flow of current through this winding will produce a field whose axis will be in a line connecting the brushes 7 and 8. This will produce an electro-motive-force between the brushes 9 and 10. Since the latter brushes are short circuited a very small electro-motive-force will produce a considerable flow of current between them, and the magneto-motive-force of this current in the armature winding will produce a field whose axis will be in the line connecting the brushes 9 and 10. The armature should be designed with a very considerable armature re-action, so that a flow of current between the brushes 9 and 10, will produce the greatest possible field strength. This field will in turn develop a very considerable electro-motive-force across the brushes 7 and 8, and this electro-motive-force will cause the battery to charge or discharge according to whether it is in the direction to oppose or assist the electro-motive-force of the battery.

It will be seen that the machine A, is designed to greatly multiply the controlling effect of the carbon regulator, so that a very small flow of current produced by the carbon regulator in the field winding 12, 13, 14, 15, sufficient to produce only a very small voltage across the brushes 9 and 10, will, by reason of the flow of current through the short circuit between those brushes, produce a very considerable voltage across the brushes 7 and 8.

In Fig. 2, the machine A, is connected as an exciter supplying current to the field F, of the booster B, the latter being connected in series between the battery and conductor 1. The operation, however, of machine A, is identical with that described in connection with Fig. 1, the only difference being that instead of controlling directly the charge and discharge of the battery it controls indirectly by acting on the field of the booster.

While I have shown the machine A, controlled by the carbon regulator R, which latter responds to small changes of load on the generator G, it will be understood that many other means for controlling the machine A, in response to changes of electric condition on a circuit may be employed. I do not, therefore, limit myself except as the prior state of the art may require, but What I do claim and desire to procure by Letters Patent is:

1. In combination an electric circuit, a branch circuit including a storage battery connected thereto, an armature having an appropriate commutator and field structure, two sets of brushes bearing upon the commutator whereof one set is electrically interconnected and the other set is provided with connections for controlling the battery current in the battery branch, a winding on the field structure operatively arranged to positively respond to changes of load on the circuit and adapted to develop an electro-motive-force between the interconnected brushes to cause a variable flow of current between the other brushes to compensate for changes of load on the circuit.

2. In combination an electric circuit, a branch circuit including a storage battery connected thereto, an armature having an appropriate commutator and field structure, two sets of brushes bearing upon the commutator whereof one set is electrically interconnected and the other set is provided with connections for controlling the battery current in the battery branch, a winding on the field structure operatively arranged to positively respond to changes of load on the circuit and adapted to develop an electro-motive-force between the interconnected brushes to cause a variable flow of current between the other brushes to compensate for changes of load on the circuit, and a second winding on the field structure connected in series with the second set of brushes and adapted to compensate for the armature reaction due to a flow of current from these brushes.

3. In combination an electric circuit, a storage battery in operative relation thereto, an armature having an appropriate commutator and field structure, two sets of brushes bearing upon the commutator whereof one set is electrically interconnected and the other set is provided with connections for controlling the current from the storage battery, a winding on the field structure adapted to produce a magnetic field and an electro-motive-force across the interconnected brushes, and a regulator for controlling the current in said winding and arranged to positively respond to the load on the circuit.

4. In combination an electric circuit, a storage battery in operative relation thereto, an armature having an appropriate commutator and field structure, two sets of brushes bearing upon the commutator whereof one set is electrically interconnected and the other set is provided with connections for controlling the current from the storage battery, a winding on the field structure adapted to produce a magnetic field and an electro-motive-force across the interconnected brushes, a regulator for controlling the current in said winding and arranged to positively respond to the load on the circuit, and a second winding on the field structure connected in series with the second set of brushes and adapted to compensate for the armature reaction due to a flow of current from these brushes.

In testimony whereof I have hereunto signed my name.

FRANK G. BEETEM.

In the presence of—
CLIFFORD K. CASSEL,
FRANK E. FRENCH.